(12) United States Patent
Fox et al.

(10) Patent No.: US 11,558,339 B2
(45) Date of Patent: Jan. 17, 2023

(54) STEPWISE RELATIONSHIP CADENCE MANAGEMENT

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Liam S. Harpur, Skerries (IE); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 695 days.

(21) Appl. No.: 16/418,923

(22) Filed: May 21, 2019

(65) Prior Publication Data

US 2020/0374258 A1   Nov. 26, 2020

(51) Int. Cl.
*H04L 51/52* (2022.01)
*G06Q 50/00* (2012.01)

(52) U.S. Cl.
CPC ............. *H04L 51/52* (2022.05); *G06Q 50/01* (2013.01)

(58) Field of Classification Search
CPC ................................ H04L 51/32; G06Q 50/01
USPC ........................................................ 709/204
See application file for complete search history.

(56) References Cited

U.S. PATENT DOCUMENTS

| | | | |
|---|---|---|---|
| 8,000,973 B2 * | 8/2011 | Williams | H04M 3/493 704/275 |
| 9,786,011 B1 * | 10/2017 | Engelhorn | G06K 9/6202 |
| 9,916,605 B2 | 3/2018 | Assem Aly Salama et al. | |
| 10,031,901 B2 | 7/2018 | Chakra et al. | |
| 10,484,542 B1 * | 11/2019 | Rager | H04L 51/02 |

(Continued)

FOREIGN PATENT DOCUMENTS

| | | | | |
|---|---|---|---|---|
| CN | 107257419 A | * | 10/2017 | ............. G06N 7/005 |
| JP | 2018513468 A | | 5/2018 | |

(Continued)

OTHER PUBLICATIONS

Abrams, LC, et al., "Nurturing interpersonal trust in knowledge-sharing networks," Academy of Management Perspectives, Nov. 1, 2003, vol. 17, No. 4, pp. 64-77.

(Continued)

*Primary Examiner* — Uzma Alam (74) *Attorney, Agent, or Firm* — Cuenot, Forsythe & Kim, LLC (57) ABSTRACT

Stepwise relationship cadence management can include generating a discourse cadence and confidence (DCC) measure based on a response message. The response message is made in replying to an originating message during a multi-party discourse over an electronic communication channel. The DCC measure indicates a likelihood of improving cadence and confidence with respect to an originator of the originating message and is based on a stepwise relational confidence model (SRCM) generated from an analysis of a plurality of prior multi-party discourses. Stepwise relationship cadence management can also include prompting a user to provide a follow-on message in response to determining that the response message made in replying to the originating message is not likely to improve cadence and confidence.

20 Claims, 7 Drawing Sheets

(56) References Cited

U.S. PATENT DOCUMENTS

| | | | |
|---|---|---|---|
| 2011/0022902 A1 | 1/2011 | Verma et al. | |
| 2011/0112995 A1 | 5/2011 | Chang et al. | |
| 2012/0246092 A1* | 9/2012 | Stibel | G06Q 30/00 |
| | | | 705/347 |
| 2015/0032724 A1* | 1/2015 | Thirugnanasundaram | |
| | | | H04L 51/32 |
| | | | 707/722 |
| 2015/0382047 A1* | 12/2015 | Van Os | G10L 17/22 |
| | | | 725/38 |
| 2016/0295018 A1* | 10/2016 | Loftus | H04M 3/2281 |
| 2016/0358240 A1* | 12/2016 | Redfern | G06F 16/248 |
| 2016/0379129 A1 | 12/2016 | Assem Aly Salama et al. | |
| 2017/0214799 A1* | 7/2017 | Perez | H04M 3/5235 |
| 2017/0277993 A1* | 9/2017 | Beaver | G06F 40/40 |
| 2017/0286377 A1 | 10/2017 | Chakra et al. | |
| 2018/0054523 A1* | 2/2018 | Zhang | G06N 5/04 |
| 2018/0146229 A1 | 5/2018 | Wilms et al. | |
| 2018/0227260 A1 | 8/2018 | Anders et al. | |
| 2018/0316638 A1* | 11/2018 | Yishay | H04L 51/234 |
| 2019/0132451 A1* | 5/2019 | Kannan | H04M 3/5235 |
| 2019/0297031 A1* | 9/2019 | Basheer | H04L 51/02 |
| 2019/0340622 A1* | 11/2019 | Azou | G06Q 30/0205 |

FOREIGN PATENT DOCUMENTS

| | | | | |
|---|---|---|---|---|
| WO | WO-2012092556 A2 * | 7/2012 | | G06Q 10/06 |
| WO | WO-2019201198 A1 * | 10/2019 | | G06Q 30/016 |

OTHER PUBLICATIONS

Abugre, JB, "How managerial interactions affect employees' work output in Ghanaian organizations," African Journal of Economic and Management Studies, Sep. 14, 2012, vol. 3, No. 2, pp. 204-226.

McGrath, L., "8 ways to build brand trust online," [online] Lucid Software Inc. © 2017 , Apr. 27, 2018, retrieved from the Internet: < https://www.lucidpress.com/blog/8-ways-build-brand-trust-online>, 6 pg.

Molin, J, et al., "Quality of interactions influences everyday life in psychiatric inpatient care—patients' perspectives," Int'l. J. Qual. Stud. Health Well-being, Jan. 22, 2016, 19 pg.

"CSS—Conditional comments," [online] Quirksmode, retrieved May 20, 2019, retrieved from the Internet: <https://www.quirksmode.org/css/condcom.html>, 3 pg.

Smale, T., "5 Strategies for How to Make Customers Trust Your Brand," [online] Entrepreneur, Feb. 15, 2017, retrieved from the Internet: <https://www.entrepreneur.com/article/289167>, 4 pg.

Subramaniam S. et al., "COBOTS—A Cognitive Multi-Bot Conversational Framework for Technical Support," In Proc. of 17th Int'l. Conf. on Autonomous Agents and MultiAgent Systems, Jul. 9, 2018, pp. 597-604.

Wang, W. et al., "Chat More: Deepening and Widening the Chatting Topic via a Deep Model," In 41st In'l. ACM SIGIR Conf. on Research & Development in Information Retrieval, Jun. 27, 2018, pp. 255-264.

Mell, P. et al., The NIST Definition of Cloud Computing, National Institute of Standards and Technology, U.S. Dept. of Commerce, Special Publication 800-145, Sep. 2011, 7 pg.

\* cited by examiner

STEPWISE RELATIONSHIP CADENCE MANAGEMENT

BACKGROUND

The present disclosure relates to the field of electronic communication, and more particularly, to multi-party discourse conducted over electronic communication networks.

Social networking and other Internet sites provide robust fora for conversations of all types among various individuals and organizations. There are numerous websites and web pages available for users to post comments regarding various issues or topics, as well as reply to other users' postings. Various online sites are used not only for social interaction but for a host of other exchanges as well, including business and education. Businesses, for example, can utilize such sites to provide information about products or services by responding to questions posted by customers and potential customers seeking information that is more specific than that provided by general advertising. Educators, for example, can interact with students through such sites, providing specific information in response to student questions. Many other types of exchange of information and views among individuals and organizations, as well, can be accomplished using such sites.

SUMMARY

A method can include generating, with a computer, a discourse cadence and confidence (DCC) measure based on a response message made in replying to an originating message during a multi-party discourse over an electronic communication channel. The DCC measure can indicate a likelihood of improving cadence and confidence with respect to an originator of the originating message. The DCC measure can be based on a stepwise relational confidence model (SRCM) generated from an analysis of a plurality of prior multi-party discourses. The method also can include prompting a user to provide a follow-on message in response to determining that the response message made in replying to the originating message is not likely to improve cadence and confidence.

A system includes a computer having at least one processor programmed to initiate executable operations. The executable operations can include generating a DCC measure based on a response message made in replying to an originating message during a multi-party discourse over an electronic communication channel. The DCC measure can indicate a likelihood of improving cadence and confidence with respect to an originator of the originating message. The DCC measure can be based on an SRCM generated from an analysis of a plurality of prior multi-party discourses. The executable operations also can include prompting a user to provide a follow-on message in response to determining that the response message made in replying to the originating message is not likely to improve cadence and confidence.

A computer program product includes a computer-readable storage medium in which is stored program code, the program code executable by computer hardware to initiate operations. The operations can include generating a DCC measure based on a response message made in replying to an originating message during a multi-party discourse over an electronic communication channel. The DCC measure can indicate a likelihood of improving cadence and confidence with respect to an originator of the originating message. The DCC measure can be based on an SRCM generated from an analysis of a plurality of prior multi-party discourses. The operations also can include prompting a user to provide a follow-on message in response to determining that the response message made in replying to the originating message is not likely to improve cadence and confidence.

DETAILED DESCRIPTION

The use of social networking and other Internet sites by individuals, businesses, educators, and various other organizations can provide many advantages. A business, for example, may maintain a Website for advising customers on product-related problems. An advocacy group may maintain a Website for providing clarification of policies proposed or endorsed by the organization. Even within an organization, an interdepartmental local area network (LAN) site may be maintained to allow members from different departments to communicate with one another more efficiently on a broader scale. Given different resource and time constraints, however, it may be difficult for an individual or even an organization to keep up with and respond to every posted comment or statement.

Very often a posted statement initiates an on-going conversation, especially if the statement poses a question or seeks a clarification. An on-going conversation typically exhibits a back and forth, or "cadence," between an originator of the statement and one or more responders to the statement. A relationship between the statement originator and an individual responder (or an organization, such as business, if the individual responder responds on behalf of the organization), typically tracks the cadence of the conversation. That relationship can change with the cadence of the conversation.

As used herein, "relationship" means an objectively measurable sense or view that a statement originator holds regarding another individual or organization. A relationship cadence, accordingly, characterizes changes in the relationship that result from communication interactions involving the other individual's or organization's one or more follow-on responses to the originator's statement. Relationship, as defined, can be measured with survey data, for example. Survey data is often elicited by asking a customer who has concluded an on-line exchange, typically with a business representative, to provide feedback, such as "satisfied" or "not satisfied" with the representative's response to a request or question posed by the customer. Relationships can be quantified as well, at least probabilistically. For example, based on statistical analysis, different responses to certain questions or requests for clarification can be assigned a probability that a specific response will elicit a certain feeling or emotion (e.g., "favorable" or unfavorable," "satisfaction" or "dissatisfaction," or even "frustration" or "anger"). Moreover, for an on-going conversation, the relationship (reflected, e.g., by an associated emotion) can change incrementally with each newly delivered message or comment, the relationship thus changing in a "stepwise" manner with the cadence of the conversation.

Relational confidence can suffer as a result of a discourse that disappoints a participant. For example, the originator of an originating statement that poses a question can lose confidence if at least one response message sufficiently responsive to the question is not timely received. The originator could be, for example, a business customer who initiates an online discourse by asking a question on how to use a business' product or how to correct a product-related problem. If an adequate response is not timely received, the discourse cadence changes—either as a result of an unresponsive reply or no replay at all—resulting in a loss of confidence that damages the business' relationship with the customer. Response messages, even from individuals who intend no harm, that are inadequate or erroneous can lead to a loss of confidence. Given the wide scope and volume of chats and other online communications, a business may find it difficult to manage responses to online comments and questions even though failing to do so can pose substantial risks to the business' customer relations and reputation.

The systems, methods, and computer program products disclosed herein automatically manage stepwise relationship cadence. The management takes place in the context of a multi-party discourse over an electronic communication channel, such as an on-line conversation between members of a social network. Stepwise relationship cadence management can determine with a specific level of confidence whether a response to a statement made during an on-going discourse over an electronic communication channel is likely to enhance or diminish a relationship between the statement's originator and a responder (or organization with which the responder is identified). Additionally, stepwise relationship cadence management can, in the context of the on-going discourse, identify a response statement that is likely to enhance the relationship. The stepwise relationship cadence management automatically manages processing and other resources more effectively and efficiently by recognizing which comments, questions, and the like warrant a response and how urgent a response should be forthcoming.

Stepwise relationship cadence management can be implemented in a computer, such as a server (e.g., cloud-based server), that communicates with one or more other computers over a data communications network. For example, stepwise relationship cadence management can be used in conjunction with a business' website. In addition to improving individual responses to questions and queries during an on-going discourse, stepwise relationship cadence management can improve the function of a server or computer system that hosts a site (e.g., business website). Stepwise relationship cadence management can reduce the load placed on the server or computer system. Specifically, stepwise relationship cadence management can automatically identify which comments or questions warrant attention, how urgent the need for attention is, and can automatically prompt a confidence-enhancing response to a question or query so identified—all of which lessens the need for the computer to be used in a longer succession of discourse exchanges and thereby lessens the processing time and processing resources necessary to resolve a matter.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
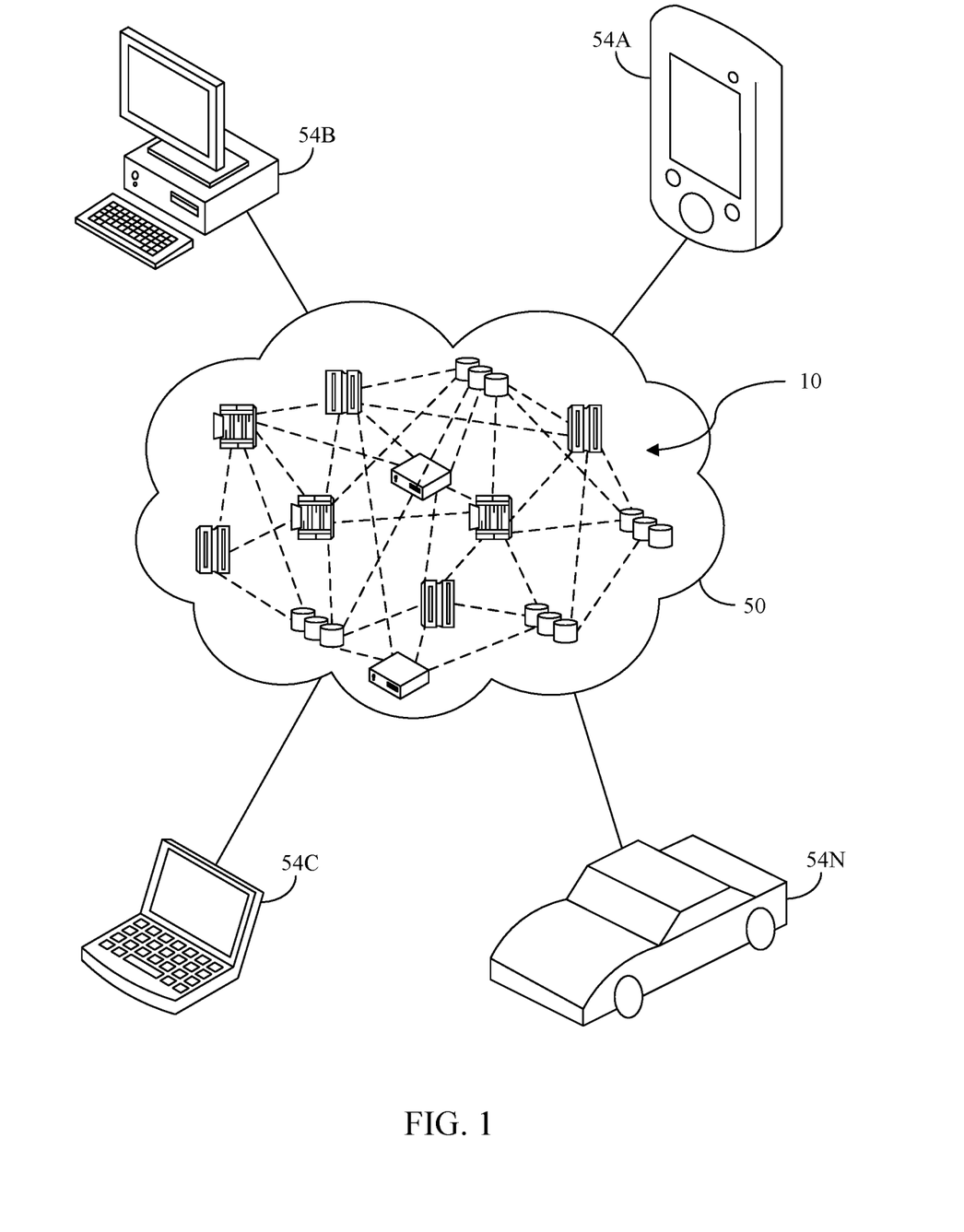
FIG. 1 depicts a cloud computing environment according to an embodiment of the present invention.

Referring now to FIG. 1, illustrative cloud computing environment 50 is depicted. As shown, cloud computing environment 50 includes one or more cloud-based computing node 10 with which local computing devices used by cloud consumers, such as, for example, personal digital assistant (PDA) or cellular telephone 54A, desktop computer 54B, laptop computer 54C, and/or automobile computer system 54N may communicate. Computing node 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing node 10 and cloud computing environment 50 can communicate with any type of computerized device over any type of network and/or network addressable connection (e.g., using a web browser).

Figure 2:
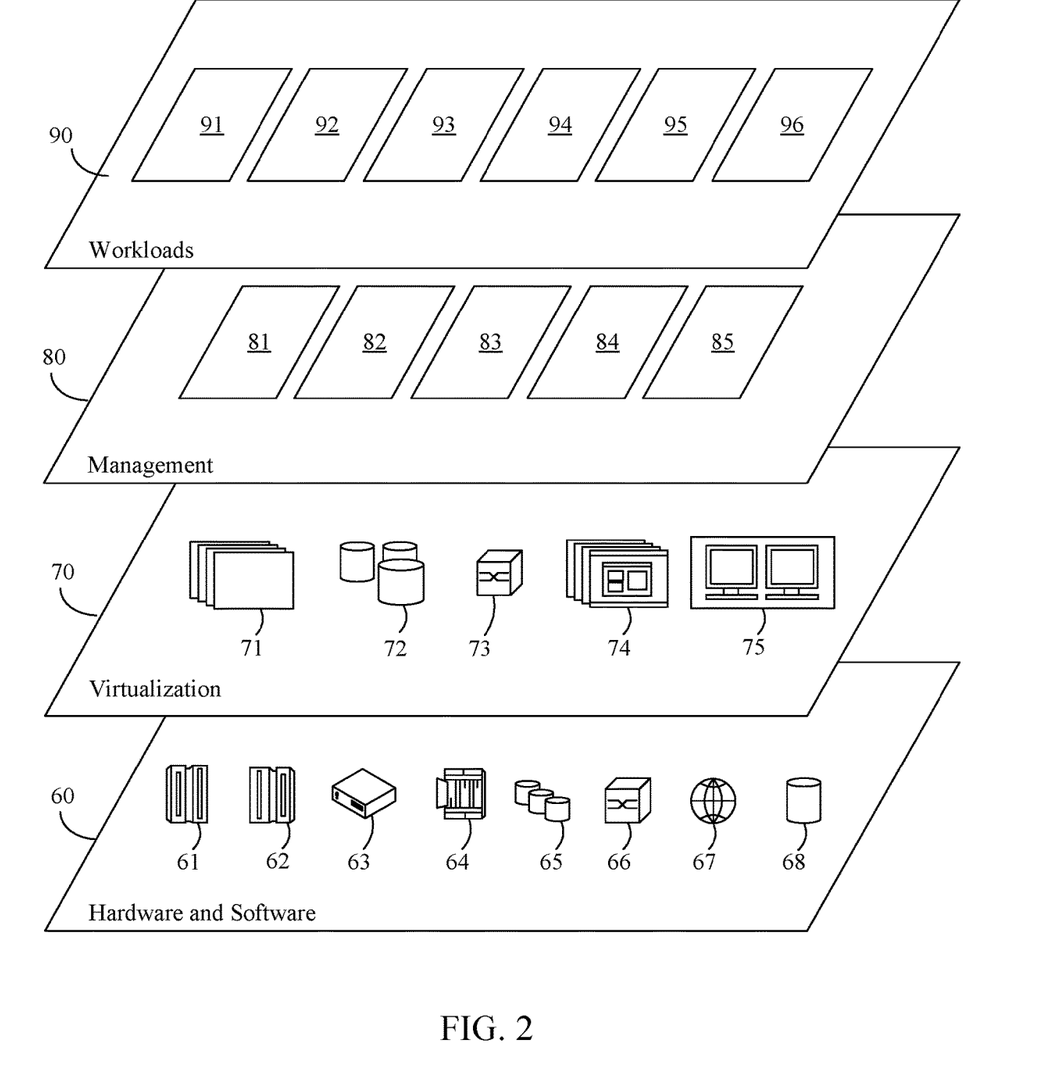
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stepwise relationship cadence management 96.

A system for stepwise relationship cadence management 96 can include an analyzer/modeler to generate a stepwise relational confidence model. The stepwise relation confidence model can be generated based on an analysis of prior discourses comprising conversations or messaging over one or more data communication networks. The model is used in the context of an on-going, multi-party discourse in which an initial message over a communications network evokes one or more response messages in reply. As defined herein, "originating message" denotes an initial post, statement, question, request, or other electronic message that initiates a multi-party discourse regarding one or more topics. A "response message," as defined herein, refers to a message that replies to or otherwise comments on an originating message (even if the message replies to a prior response message, but nonetheless addresses the topic of the originating message) as part of the multi-party discourse. Accordingly, as defined herein, "multi-party discourse" denotes the originating message and the one or more response messages that are made in replying to the originating message. The system for stepwise relationship cadence management 96, operating on a network-coupled computing node (e.g., server), can be used to measure discourse cadence and confidence and to identify opportunities to improve cadence and confidence during an on-going, multi-party discourse over a communications network (e.g., Internet or other data communications network).

Figure 3:
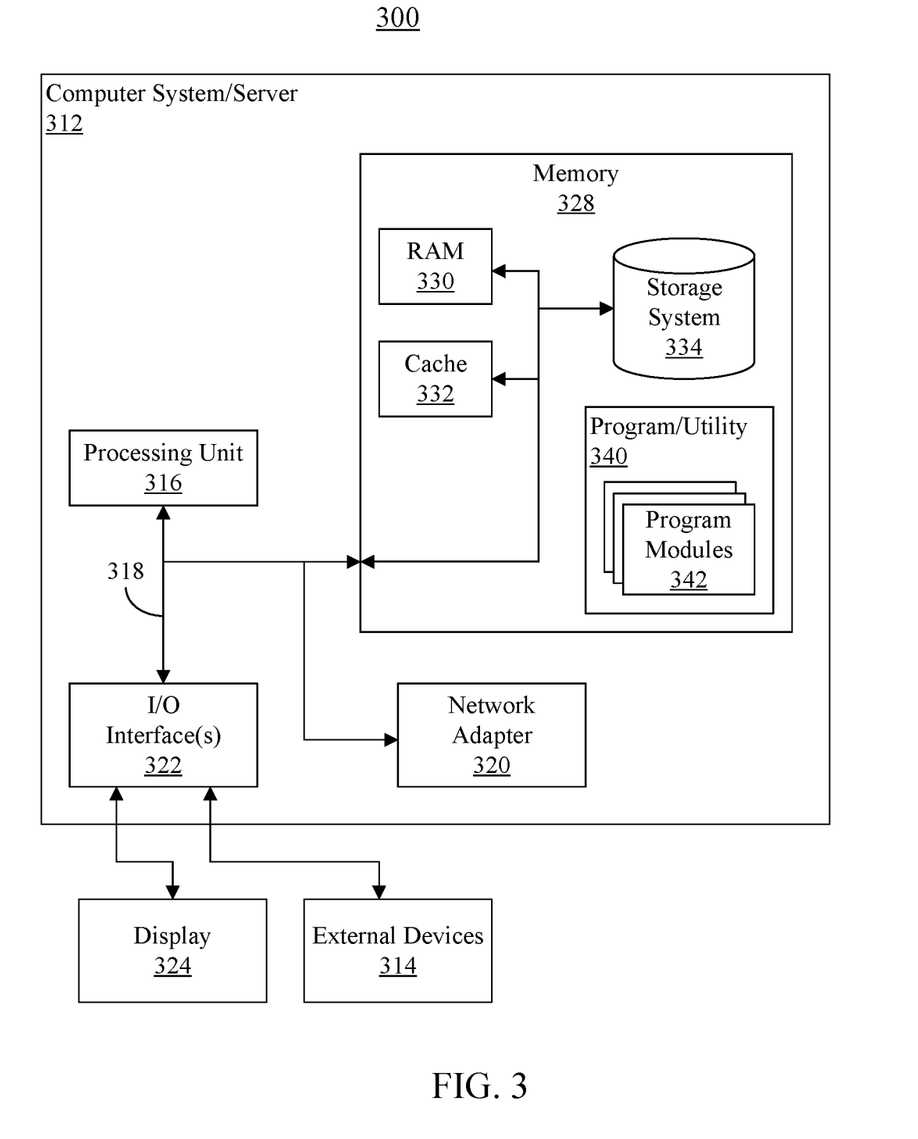
FIG. 3 depicts a cloud computing node according to an embodiment of the present invention.

Referring now to FIG. 3, a schematic of an example of a computing node is shown. Computing node 300 is only one example of a suitable computing node (e.g., cloud computing node) and is not intended to suggest any limitation as to the scope of use or functionality of embodiments described herein. Regardless, computing node 300 is capable of being implemented and/or performing any of the functionality set forth hereinabove.

Computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in computing node 300 is shown in the form of a general-purpose computing device. The components of computer 312 may include, but are not limited to, one or more processors 316, a memory 328, and a bus 318 that couples various system components including memory 328 to processor 316.

Processor 316 can comprise a multi-core processor (e.g., quad core or octa core) having two or more independent processing units, termed cores, that read and execute program instructions (processor-executable code) concurrently. Each core can separately execute multiple instructions of programs specifically designed for parallel processing and drawn from various application domains, including general-purpose applications and specific-purpose applications such as digital signal processing.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the described.

Computer 312 typically includes a variety of computer-readable media. Such media may be any available media that is accessible by computer 312, and includes both volatile and non-volatile media, removable and non-removable media.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may include system for implementing the system for stepwise relationship cadence management 96 or portions thereof. Program/utility 340 is executable by processor 316. Program/utility 340 and any data items used, generated, and/or operated upon by computing node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via input/output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
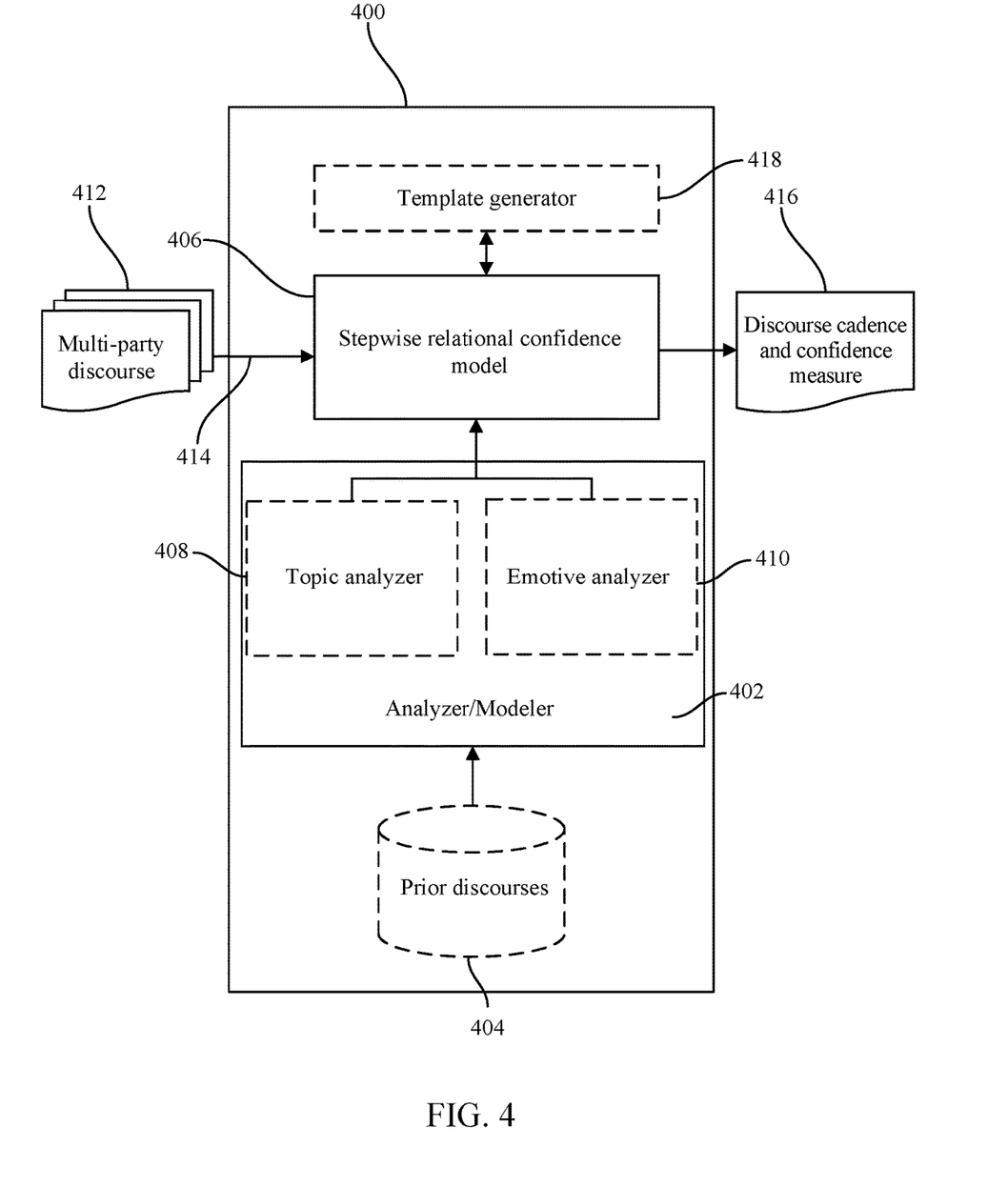
FIG. 4 depicts a stepwise relationship cadence management system according to an embodiment of the present invention.

FIG. 4 depicts one embodiment of a system 400 such as the system for stepwise relationship cadence management 96 described in the context of the workload and function examples illustrated in FIG. 2. System 400 illustratively includes analyzer/modeler 402 communicatively coupled to prior discourses database 404. Analyzer/modeler 402 analyzes the prior discourses, and based on the analysis, generates stepwise relational confidence model (SRCM) 406. SRCM 406 is a model for identifying, based on newly presented discourse data (electronically rendered text), opportunities to improve cadence and communication confidence in the context of an on-going, multi-party discourse.

In one embodiment, system 400 can be implemented in processor-executable code that resides on a server (e.g., cloud-based server) or other type of computer such as computer 312 of FIG. 3. Accordingly, as processor-executable code, system 400 can reside in a memory such as memory 328 of computer 312 and can execute on a processor such as processor 316 when conveyed to the processor via a bus such as bus 318. The server or computer, for example, can be an enterprise server that hosts an Internet-based website that provides a venue for a business' personnel to interact with the business' existing and potential customers. The server or computer, alternatively, can be communicatively coupled to a local area network (LAN) and operating as an inter-departmental forum for members of an enterprise or organization to exchange messages on various topics. Though there are numerous other examples of the type of network arrangement on which system 400 can operate, a shared feature of each is the system's ability to manage stepwise relationship cadence and to improve cadence and communication confidence with respect to a multi-party discourse over the communications network.

Prior discourses database 404, as illustrated, can be electronically stored on the same computer on which analyzer/modeler 402 resides. Alternatively, prior discourses database 404 can be stored separately on a different device accessible via a data communications network connection (not explicitly shown). Prior discourses can be gathered from various publicly available sources. For example, the prior discourses can be gathered from online platforms, such as social networking sites and/or a host site with which system 400 is operatively coupled.

Each prior discourse collected in prior discourses database 404 comprises textual renderings of conversations, sets of two or more messages, chats, or other electronic communications between two or more parties over a data communications network (e.g., Internet). The messages are characterized by an initial or originating message (e.g., an initial comment, question, or request) that evokes one or more response messages in reply. The party initiating the multi-party discourse by submitting an originating message is referred herein as the "originator" and a party submitting a response message in reply to the originating message is referred to as a "responder."

As electronically rendered text, individual messages in prior discourses comprise character strings representing words. Analyzer/modeler 402 converts the prior discourse messages collected in prior discourses database 404 into machine-usable data. For example, analyzer/modeler 402 using the bag-of-words model, term frequency-inverse document frequency (tf-idf), or similar technique can map prior discourse messages into n-dimensional feature vectors that provide the inputs to analyzer/modeler 402 for generating SRCM 406 using machine learning. For example, the feature vectors can each be labeled to provide a dataset for training SRCM 406 using supervised learning (e.g., deep neural networks, support vector machine). SRCM 406 so trained can classify a message newly presented to the model (as a feature vector) or determine the probability that the message has a certain characteristic. Alternatively, without labels, the feature vectors can provide a dataset for training SRCM 406 using unsupervised learning (e.g., clustering). SRCM 406 then can group messages based on a metric such Euclidean distance.

Once generated by analyzer/modeler 402 using machine learning, SRCM 406 can determine which response messages, newly presented in the context of an on-going discourse, are more likely to enhance cadence and communication confidence and which are more likely to diminish cadence and confidence. Message cadence refers to the timing or frequency of message postings during a discourse, and confidence refers to the probability that the content of the message is relevant to a given topic of the discourse. A measure of cadence and communication confidence based on both posting frequency/timing and topic relevancy is generated by SRCM, as described below. Moreover, SRCM 406 can identify opportunities to improve cadence and communication confidence during the on-going discourse by generating a discourse.

In one embodiment, analyzer/modeler 402 comprises topic analyzer 408 for identifying one or more discourse topics addressed in a specific message. Topic analyzer 408, in one embodiment, applies a latent Dirichlet allocation (LDA) to discover discrete topics within messages. Given a specific number of topics, the LDA algorithm assigns a topic to each word in the collection of conversations and extracts topics based on the number of words of each topic present in each conversation. LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. Accordingly, the corpora of prior discourses collected in prior discourses database 404 and rendered as textual data can be, as with other text corpora, analyzed by analyzer/modeler 402 using LDA to identify topics and extract topical indicia from the prior discourses.

Analyzer/modeler 402, in one embodiment, also comprises emotive analyzer 410. Emotive analyzer 410 predicts emotions and tones of the author of a message based on the textual rendering of the message. Emotive analyzer 410, using linguistic analysis, initially parses a textual rendering of a message into sentences and tokens. Nouns, verbs, and other parts of speech are identified by emotive analyzer 410 using parts-of-speech tagging once the textual rendering is parsed into sentences and tokens. Emotive analyzer 410 determines the internal structure and meaning of the textual rendering (e.g., entities, purpose, and the like) by breaking the sentences into labeled phrases, including ones identified by emotive analyzer 410 as specific emotions (e.g., joy, fear, sadness, anger, frustration, excitement) and/or tones (e.g., analytical, confident, tentative).

Referring still to FIG. 4, during a multi-party discourse one or more textual renderings 412 of messages comprising the discourse are conveyed via communication channel 414 to system 400. System 400 generates a discourse cadence and confidence (DCC) measure based on a response message made in replying to an originating message during the multi-party discourse. The DCC measure, based on the SRCM, can indicate a likelihood of improving cadence and confidence with respect to an originator of the originating message. Responsive to determining that the response message made in replying to the originating message is not likely to improve cadence and confidence, system 400 prompts a system user to provide a follow-on message.

Figure 5:
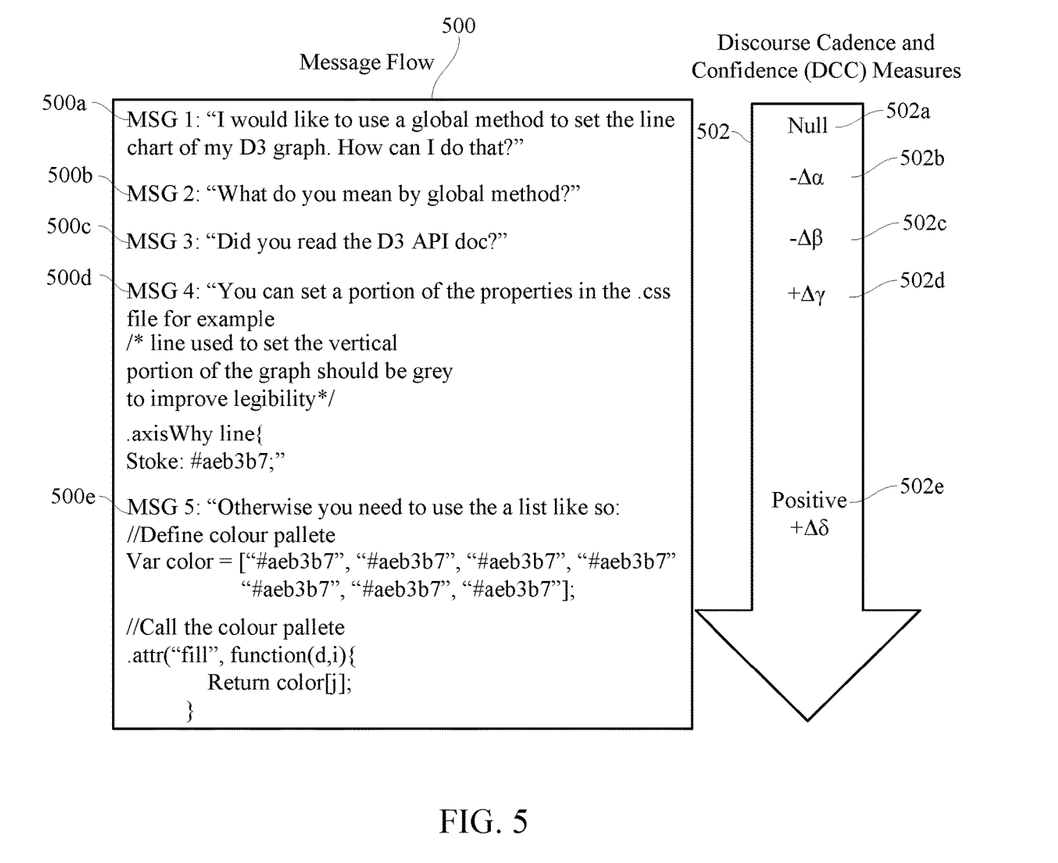
FIG. 5 depicts certain operative features of a stepwise relationship cadence management system according to an embodiment of the present invention.

Referring additionally to FIG. 5, the textual renderings 412 conveyed via communication channel 414 are represented by the series of example messages comprising message flow 500. An example series of DCC measures 502 is generated by SRCM 406 in response to the message flow 500. The initial message of message flow 500 is originating message 500a. An initial DCC measure baseline remains unchanged at 502a. System 400 analyzes first response message 500b when it is offered in reply to originating message 500a. First response message 500b is only weakly on topic (reference to global method) and tentative in tone, replying to the initial question with a question. SRCM 406 determines that first response message 500b is likely to diminish the confidence of the originator of originating message 500a and decreases the DCC measure by Aa at 502b. Confidence is further reduced by second response message 500c. System 400 determines that second response message 500c is only slightly closer on point than the previous message and is also tentative in tone. SRCM 406 determines that response message 502c is likely to diminish confidence and decreases the DCC measure by $\Delta\beta$ at 502c.

System 400, in managing the stepwise relationship cadence, can respond to a determination, based on the DCC measure, that a response measure is likely to diminish cadence and confidence—or otherwise not likely to improve cadence and confidence—by prompting a follow-on message. In one scenario involving an organization-supported website, such as a business, for example, the system automatically identifies originating messages that warrant a response, and a representative of the organization can respond to the prompt with the follow-on message. In FIG. 5, a system-generated prompt elicits third response message 500d. The message, from an acknowledged expert, is on topic, analytical and confident in tone. SRCM 406 determines that third response message 500d is likely to enhance confidence and increases the DCC measure by $\Delta\gamma$. Fourth response message 500e, submitted by another expert, is also on topic, analytical and confident in tone. SRCM 406 determines response message 500d is likely to enhance confidence and increases the DCC measure by M. Optionally, system 400 can determine, based on summing the changes, whether the net result of the response messages is an increase or a decrease of the DCC measure relative to a baseline value. If the net result is below the baseline, system 400 can issue a prompt for an additional confidence-enhancing response message. In general, system 400 can identify opportunities to improve cadence and communication confidence during an on-going, multi-party discourse based on the DCC measure generated by SRCM 406.

A response message that is not sufficiently on point, is unlikely to be adequately responsive to an originating message. Accordingly, in one embodiment, the precision of SRCM 406 is enhanced by determining response message relevance to an originating message based on semantic distance. For example, the originating message and a corresponding response message can each be represented by feature vectors whose values are derived from topic modeling of the respective messages. A semantic distance between the originating message and response message can be determined based on a Euclidean distance between the vector representations (vectors in bold):

$$d(x_i, x_j) = \sqrt{\Sigma_{k=1}^{n}(x_i^{(k)} - x_j^{(k)})^2},$$

where $x_i = (x_i^{(1)}, x_i^{2}, \ldots, x_i^{(n)})$ and $x_j = (x_j^{(1)}, x_j^{(2)}, \ldots, x_j^{(n)})$ are each n-dimensional feature vectors corresponding, respectively, to the originating message and a response message. As an alternative metric, SRCM 406 can determine the feature vectors' cosine similarity:

$$\cos(\angle(x_i, x_j)) = \frac{\sum_{k=1}^{n} x_i^{(k)} x_j^{(k)}}{\sqrt{\sum_{k=1}^{n} (x_i^{(k)})^2} \sqrt{\sum_{k=1}^{n} (x_j^{(k)})^2}}.$$

SRCM 406 can determine topical relevance of a response message using either metric. If the distance or the angle between two topic-modeled feature vectors (originating message and response message) is greater than a predetermined threshold (e.g., determined based on an average distance or angle for topic-modelled messages drawn from prior discourses database 404), then the response message is not likely sufficiently on point relative to the originating message in terms of a specific topic or set of topics. Quantitatively, the greater the difference, the less likely it is that the response message is sufficiently on topic.

The DCC measure generated by SRCM 406 can be generalized to one-to-many communications (e.g., group type communications). If a cadence and communication confidence relative to a real-time chat discourse is modeled, then a one-to-many DCC measure can be generated with respect to multiple response messages regarding a specific topic (e.g., in the case of multiple experts providing alternate solutions to a specific domain problem).

Using known feature engineering techniques, the feature vectors used to train SRCM 406 can be extended beyond topic and tone to include various other types of features. Features can include, for example, the experience or education of a response message's author (e.g., a CV or vita accessible on a social networking or other site). Such author-specific features can include, for example, the number of times the author's responses have elicited favorable follow-on comments regarding a specific topic (e.g., a message author may be identified as an expert or someone highly knowledgeable on the specific topic by virtue of the "likes" applied to the author's online comments). The features also can include the message's topical relevancy or relatedness.

One aspect of stepwise relationship cadence management is using processing and other resources effectively and efficiently. A part of this is recognizing which comments, questions, and the like warrant attention and how urgently a response is needed. Accordingly, another feature that optionally can be incorporated in the feature vectors is the length of time (assuming message timestamping capability of system 400) before an originator of an originating message drops out of a discourse either because no sufficiently credible response message—or no response message at all—is received within that length of time. Urgency can also be reflected in the number of similar comments or questions posed, reflecting the notion that the greater the number, the greater the need for a timely response message. Still another feature, based on crowdsourcing techniques, is the number of "likes" applied to a question or comment, again, the greater the number, the more urgent the need for a timely response message.

Using the previously described machine learning approaches, SRCM 406 can be trained using feature vectors that incorporate additional features such as the skillset or expertise of a message's author, timestamp, or the like. So trained, SRCM 406 can classify newly presented originating messages based on an assessed level of urgency in responding to the messages. For example, SRCM 406 can generate a DCC measure that is a confidence score indicating an event probability of an event, such as the probability that an originator will leave on-going discourse if an adequate response message (e.g., informed answer to a question posed) is not provided within a certain time or by a responder having a certain level of skill or expertise.

System 400 optionally can further include response template generator 418. Response template generator 418 uses machine learning to train a classification model for classifying each originating message into one of two or more classes, each class having a specific template that can be used to provide a confidence-enhancing response message in reply to the originating message. Response template generator 418 can train the classification model using a classification learning algorithm that takes a collection of labeled messages as inputs and generates a model, which then takes unlabeled messages as inputs and outputs a model-determined label or probability for classifying the initially unlabeled messages.

Figure 6:
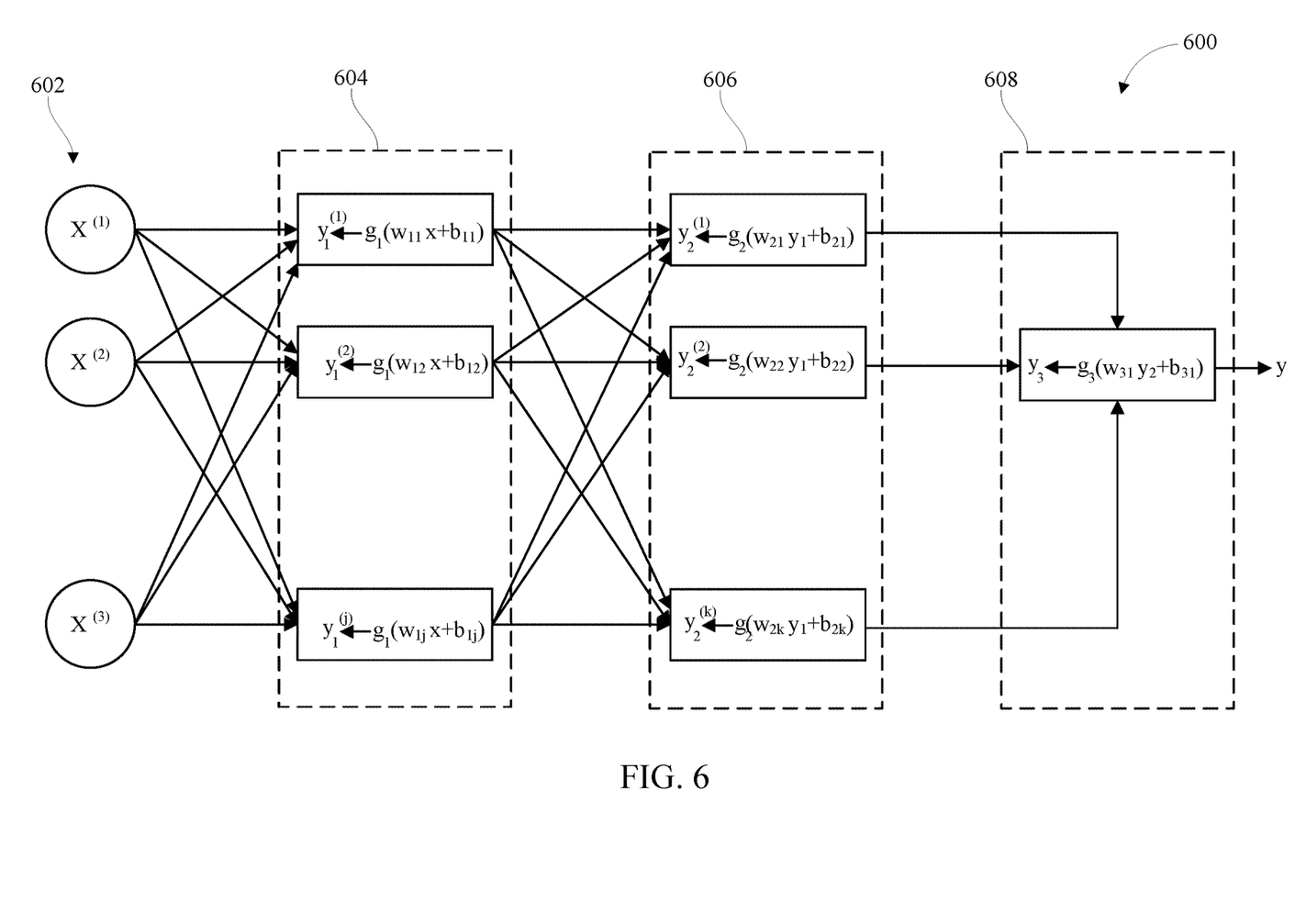
FIG. 6 depicts an example of a deep neural network architecture of a stepwise relationship cadence management system according to one embodiment of the present invention.

Response template generator 418 can use a deep neural network architecture to train the classification model. The training set can comprise a set of initial interactions that include, for example, originating messages and example response messages replying to corresponding originating messages represented as feature vectors with associated values (e.g., preset thresholds, preferences, and user feedback). FIG. 6 depicts a deep neural network architecture 600 comprising an input layer 602, hidden layer 604, hidden layer 606, and output layer 608. Input layer 602 comprises each feature $x^{(i)}$ of the input vector. Each originating message is a sequence of words that can be converted to a vector, x, for input into input layer 602 using a known method such as term frequency-inverse document frequency (tf-idf), bag-of-words, or other frequency-based technique. The input vector to input layer 602, to hidden layer 604 and to output layer 608 is the output vector of the preceding layer. Each unit of hidden layers 604 and 606 and of output layer 608 applies a linear transformation, $(w_{ij} \cdot x + b_{ij})$ and $(w_{ij} \cdot y_j + b_{ij})$, and then applies an activation function, $g_i$, to each linearly transformed value, yielding $y_i^m \leftarrow g_i(w_{ij} \cdot x + b_{ij})$ and $y_i^m \leftarrow g_i(w_{ij} \cdot y_j + b_{ij})$. The weight vectors, $w_{ij}$, are learned by applying the backpropagation algorithm to the training set.

In one embodiment, response template generator 418 can use machine learning to train the classification model to capture metadata (e.g., attributes of the originator of an originating message, times of messaging) and past system interactions (e.g., reflecting the idea that a user who has interacted with the system for an extended period may not expect the same answer when compared to a new originator posting a first originating message, because the former's patience threshold may be much lower than the latter's). In various other embodiments, response template generator 418 can use machine learning to train the classification model to classify each originating message into one of two or more classes based on other feature values of a feature vector representation each originating message.

Depending on the classification, response template generator 418 can generate a template that indicates certain characteristics to include in a follow-on message if a previous response message is determined not to be likely to improve cadence and confidence. For example, the characteristic may correspond to the level of expertise, reputation, or skillset of the responder who offers the follow-on message in reply to the originating message. The characteristic, for example, may indicate the urgency for responding to the originating message. The characteristic may indicate a probability that the originator will drop out of a discourse if the follow-on message is not provided within a certain time. Each template generated by response template generator 418 comprises at least one characteristic needed for inclusion in the follow-on message.

In another embodiment, a response template can comprise a set of preconstructed response messages that can be electronically stored in a database communicatively coupled to system 400. Based on the classification determined by the response template generator 418, a specific preconstructed response message having the characteristic or characteristics indicated by the template as needed for inclusion in a follow-on message can be selected by the template generator. System 400 can convey the preconstructed response message selected by the system over the data communications network in reply to an originating message. Accordingly, the preconstructed response message is conveyed in addition to or in lieu of a user constructed response message (informed by the template as to what to include) in replying to the originating message.

Response template generator 418 can be implemented, for example, as processor-executable code electronically storable in memory and executable on a process, such as memory 328 and process 316 of computer 312 illustrated in FIG. 3.

Figure 7:
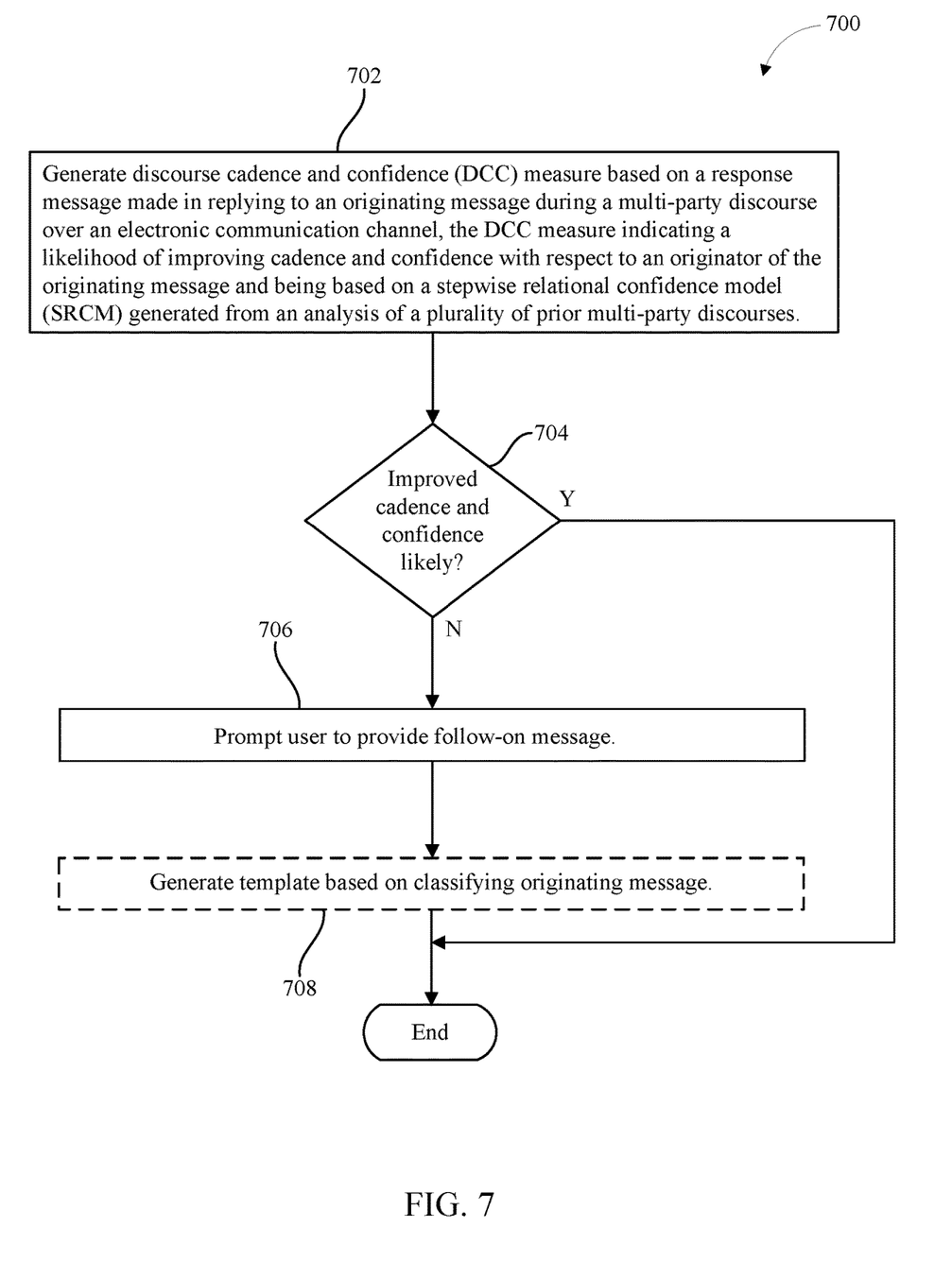
FIG. 7 is a flowchart of a method of a stepwise relationship cadence management according to one embodiment of the present invention.

FIG. 7 is a flowchart of method 700 for stepwise relationship cadence management, according to one embodiment. Method 700 can be performed by a stepwise relationship cadence management system the same as or similar to the systems described in reference to FIGS. 1-6 The method can begin with the initiation of a multi-party discourse on a data communications network (e.g., Internet) that starts with an originator submitting an originating message that the system determines warrants a reply. At 702, the system responds to a response message made in replying to the originating message by generating a discourse cadence and confidence (DCC) measure based on the response message. The DCC measure indicates a likelihood of improving cadence and confidence with respect to the originator and is based on a stepwise relational confidence model (SRCM). The SRCM is generated from an analysis of prior multi-party discourses. If the system determines at 704 that the response message made in replying to the originating message is not likely to improve cadence and confidence, the system prompts a user to provide a follow-on message at 706.

The operations can be performed automatically with the system executing on a server or other type of computer, which in one scenario is part of a networked system maintained by an entity such as a business or other organization. The business, for example, can host an Internet website that allows the business to interact online with existing and potential customers. The originator of the originating message can be a customer, and the originating message can be a question regarding a product or requesting guidance regarding a problem the customer is experiencing. The responder (system user) can be a representative of the business. The responder can provide a response message to the originating message. The system-determined DCC measure provides an indication of the likelihood of improving cadence and confidence with respect to the originator. The likelihood is a probability that the discourse will conclude at or continue (the cadence) to a point that the customer (the originator) receives a response that the system determines is likely to secure the business' relationship with the customer (confidence).

The DCC measure can indicate a specific event probability. The event probability, for example, can be a probability that the originator will end the on-going discourse in response to the follow-on message not being provided within a predetermined length of time. The event probability, for example, can be a probability that the originator will end the on-going discourse in response to the follow-on message not being provided by a responder having acknowledged credibility.

Optionally, at 708, the system can generate a set of templates. Each template can provide a framework for responding to the originating message with a follow-on message if an earlier response message is determined not likely to improve cadence and confidence. A specific template can be selected depending on the originating message's type or classification. An originating message can be classified using a classification model constructed using machine learning (e.g., based on a deep neural network architecture) and a collection of prior discourses that provide training examples for training the model.

Each template corresponds to a specific message classification and can indicate one or more characteristics (e.g., level of expertise of the responder or recognized position of the responder within a social network) pertaining to a follow-on message. A template can be constructed, for example, based on topic analysis, emotive analysis, and/or social network position analysis. A template can be constructed to include terms identified within an existing corpus of terms used to train the SRCM based on the analysis of prior multi-party discourses. Terms can be identified, for example, based on a Euclidean distance or cosine similarity, as described above. Once a topic and relevant terms associated therewith are identified by the SRCM, the system can surface the relevant terms and suggest the terms (e.g., in a prompt) to a system user. The user can use the surfaced terms in responding to an originating message with a response message that includes the terms so as to maintain cadence and confidence communication and continue moving a conversation, chat, other discourse forward.

Accordingly, method 700 can include identifying during the multi-party discourse at least one term or other characteristic (e.g., explanatory diagram, list of instructions, summary of pertinent items) for inclusion in the follow-on message in response to determining that the response message made in replying to the originating message is not likely to improve cadence and confidence. Characteristics are identified by the SRCM and included in specific templates associated with distinct classes of originating messages. In one embodiment, method 700 can include notifying the one or more characteristics to a system user tasked with submitting a follow-on message. In another embodiment, each template can comprise a preconstructed follow-on message, and method 700 can include automatically selecting a preconstructed follow-on message based on the classification of the originating message.

Each of the described methods can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-7 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
generating, with a computer, a discourse cadence and confidence (DCC) measure based on a response message made in replying to an originating message during a multi-party discourse over an electronic communication channel, wherein the DCC measure indicates a likelihood of improving cadence and confidence with respect to an originator of the originating message, wherein the cadence characterizes changes in a relationship resulting from communication interactions during the multi-party discourse, wherein the DCC measure is based on a stepwise relational confidence model (SRCM), generated from an analysis of a plurality of prior multi-party discourses, that determines whether the response message will diminish a confidence, of an originator of the originating message, at securing a business relationship, and wherein the SRCM is trained, using machine learning, to determine characteristics of messages, the machine learning comprising converting, using an analyzer modeler, prior discourse messages in the prior multi-party discourses into machine-usable data by mapping n-dimensional feature vectors that provide inputs to the analyzer/modeler used to generate the SRCM using the machine learning;
responsive to determining that the response message made in replying to the originating message is not likely to improve cadence and confidence, prompting a user to provide a follow-on message.

2. The method of claim 1, wherein the analysis of a plurality of prior multi-party discourses comprises at least one topic analysis and at least one emotive analysis.

3. The method of claim 1, further comprising:
identifying during the multi-party discourse at least one characteristic for inclusion in the follow-on message in response to determining that the response message made in replying to the originating message is not likely to improve cadence and the confidence, of the originator of the originating message, at securing the business relationship; and
notifying the at least one characteristic to the user.

4. The method of claim 1, further comprising:
identifying during the multi-party discourse at least one characteristic for inclusion in the follow-on message in response to determining that the response message made in replying to the originating message is not likely to improve cadence and the confidence, of the originator of the originating message, at securing the business relationship; and automatically selecting a preconstructed follow-on message that comprises the at least one characteristic.

5. The method of claim 1, further comprising identifying during the multi-party discourse at least one characteristic for inclusion in the follow-on message in response to determining that the response message made in replying to the originating message is not likely to improve cadence and the confidence, of the originator of the originating message, at securing the business relationship, wherein the identifying comprises identifying at least one term within an existing corpus of terms based on the analysis of a plurality of prior multi-party discourses.

6. The method of claim 1, wherein the DCC measure indicates an event probability.

7. The method of claim 6, wherein the event probability comprises at least one probability selected from a group consisting of a probability that the originator will end the multi-party discourse in response to the follow-on message not being provided within a predetermined length of time and a probability that the originator will end the multi-party discourse in response to the follow-on message not being provided by a responder having acknowledged credibility.

8. A system, comprising:
a computer having at least one processor programmed to initiate executable operations, the executable operations including:
generating a discourse cadence and confidence (DCC) measure based on a response message made in replying to an originating message during a multi-party discourse over an electronic communication channel, wherein the DCC measure indicates a likelihood of improving cadence and confidence with respect to an originator of the originating message, wherein the cadence characterizes changes in a relationship resulting from communication interactions during the multi-party discourse, wherein the DCC measure is based on a stepwise relational confidence model (SRCM), generated from an analysis of a plurality of prior multi-party discourses, that determines whether the response message will diminish a confidence, of an originator of the originating message, at securing a business relationship, and wherein the SRCM is trained, using machine learning, to determine characteristics of messages, the machine learning comprising converting, using an analyzer modeler, prior discourse messages in the prior multi-party discourses into machine-usable data by mapping n-dimensional feature vectors that provide inputs to the analyzer/modeler used to generate the SRCM using the machine learning; and
responsive to determining that the response message made in replying to the originating message is not likely to improve cadence and confidence, prompting a user to provide a follow-on message.

9. The system of claim 8, wherein the analysis of a plurality of prior multi-party discourses comprises at least one topic analysis and at least one emotive analysis.

10. The system of claim 8, wherein the executable operations further include:
identifying during the multi-party discourse at least one characteristic for inclusion in the follow-on message in response to determining that the response message made in replying to the originating message is not likely to improve cadence and the confidence, of the originator of the originating message, at securing the business relationship; and
notifying the at least one characteristic to the user.

11. The system of claim 8, wherein the executable operations further include:
identifying during the multi-party discourse at least one characteristic for inclusion in the follow-on message in response to determining that the response message made in replying to the originating message is not likely to improve cadence and the confidence, of the originator of the originating message, at securing the business relationship; and
automatically selecting a preconstructed follow-on message that comprises the at least one characteristic.

12. The system of claim 8, wherein the executable operations further include identifying during the multi-party discourse at least one characteristic for inclusion in the follow-on message in response to determining that the response message made in replying to the originating message is not likely to improve cadence and the confidence, of the originator of the originating message, at securing the business relationship, and wherein the identifying comprises identifying at least one term within an existing corpus of terms based on the analysis of a plurality of prior multi-party discourses.

13. The system of claim 8, wherein the DCC measure indicates an event probability.

14. A computer program product, comprising:
a computer-readable storage medium having program code stored thereon, the program code executable by computer hardware to initiate operations including:
generating, with a computer, a discourse cadence and confidence (DCC) measure based on a response message made in replying to an originating message during a multi-party discourse over an electronic communication channel, wherein the DCC measure indicates a likelihood of improving cadence and confidence with respect to an originator of the originating message, wherein the cadence characterizes changes in a relationship resulting from communication interactions during the multi-party discourse, wherein the DCC measure is based on a stepwise relational confidence model (SRCM), generated from an analysis of a plurality of prior multi-party discourses, that determines whether the response message will diminish a confidence, of an originator of the originating message, at securing a business relationship, and wherein the SRCM is trained, using machine learning, to determine characteristics of messages, the machine learning comprising converting, using an analyzer modeler, prior discourse messages in the prior multi-party discourses into machine-usable data by mapping n-dimensional feature vectors that provide inputs to the analyzer/modeler used to generate the SRCM using the machine learning; and
responsive to determining that the response message made in replying to the originating message is not likely to improve cadence and confidence, prompting a user to provide a follow-on message.

15. The computer program product of claim 14, wherein the analysis of a plurality of prior multi-party discourses comprises at least one topic analysis and at least one emotive analysis.

16. The computer program product of claim 14, wherein the operations further include:
identifying during the multi-party discourse at least one characteristic for inclusion in the follow-on message in response to determining that the response message made in replying to the originating message is not likely to improve cadence and the confidence, of the originator of the originating message, at securing the business relationship; and notifying the at least one characteristic to the user.

17. The computer program product of claim 14, wherein the operations further include:

identifying during the multi-party discourse at least one characteristic for inclusion in the follow-on message in response to determining that the response message made in replying to the originating message is not likely to improve cadence and the confidence, of the originator of the originating message, at securing the business relationship; and automatically selecting a preconstructed follow-on message that comprises the at least one characteristic.

18. The computer program product of claim 14, wherein the operations further include identifying during the multi-party discourse at least one characteristic for inclusion in the follow-on message in response to determining that the response message made in replying to the originating message is not likely to improve cadence and the confidence, of the originator of the originating message, at securing the business relationship, and wherein the identifying comprises identifying at least one term within an existing corpus of terms based on the analysis of a plurality of prior multi-party discourses.

19. The computer program product of claim 14, wherein the DCC measure indicates an event probability.

20. The computer program product of claim 19, wherein the event probability comprises at least one probability selected from a group consisting of a probability that the originator will end the multi-party discourse in response to the follow-on message not being provided within a predetermined length of time and a probability that the originator will end the multi-party discourse in response to the follow-on message not being provided by a responder having acknowledged credibility.

* * * * *